(12) United States Patent
Zhou et al.

(10) Patent No.: US 12,471,132 B2
(45) Date of Patent: Nov. 11, 2025

(54) COMMON DEFAULT BEAM PER COMPONENT CARRIER GROUP

(71) Applicant: QUALCOMM Incorporated, San Diego, CA (US)

(72) Inventors: Yan Zhou, San Diego, CA (US); Tianyang Bai, Mountain View, CA (US); Tao Luo, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/425,343

(22) Filed: Jan. 29, 2024

(65) Prior Publication Data

US 2024/0172264 A1    May 23, 2024

Related U.S. Application Data

(63) Continuation of application No. 17/026,023, filed on Sep. 18, 2020, now Pat. No. 11,943,795.
(Continued)

(51) Int. Cl.
*H04W 72/0453* (2023.01)
*H04W 24/08* (2009.01)
(Continued)

(52) U.S. Cl.
CPC ......... *H04W 72/542* (2023.01); *H04W 24/08* (2013.01); *H04W 72/0453* (2013.01); *H04W 72/046* (2013.01)

(58) Field of Classification Search
None
See application file for complete search history.

(56) References Cited

U.S. PATENT DOCUMENTS

2019/0141693 A1\* 5/2019 Guo .................. H04W 72/1268
2019/0230545 A1   7/2019 Liou et al.
(Continued)

FOREIGN PATENT DOCUMENTS

EP        4008121 A1    6/2022
WO   WO2018171044 A1   9/2018
(Continued)

OTHER PUBLICATIONS

Intel Corporation: "On QCL for NR", 3GPP TSG RAN WG1 Meeting NR#3, 3GPP Draft; R1-1716304 on QCL for NR, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), pp. 1-7, XP051339760, p. 4, paragraph 1.
(Continued)

*Primary Examiner* — Jenkey Van
(74) *Attorney, Agent, or Firm* — Holland & Hart LLP

(57) ABSTRACT

Wireless communications systems may support identification or determination of a common default beam for a component carrier (CC) group (e.g., such that all CCs of a CC group may be associated with a same default beam). For example, a CC group may be configured or established to include one or more CCs (e.g., for carrier aggregation), where each CC group may share a same analog beamformer. As such, a beam (e.g., a default uplink/downlink beam) may be established as default or common across CCs of a CC group (e.g., versus default beams being configured or established for individual CCs). Such an established default beam of a CC group (e.g., a default beam common to all CCs of a CC group) may include or refer to a default downlink shared channel beam, a default sounding reference signal (SRS) beam, a default downlink control channel beam, etc.

15 Claims, 10 Drawing Sheets

Related U.S. Application Data

(60) Provisional application No. 62/938,208, filed on Nov. 20, 2019.

(51) Int. Cl.
*H04W 72/044* (2023.01)
*H04W 72/542* (2023.01)

(56) References Cited

U.S. PATENT DOCUMENTS

| | | | |
|---|---|---|---|
| 2019/0312698 A1 | 10/2019 | Akkarkaran et al. | |
| 2021/0083748 A1* | 3/2021 | Guan | H04B 7/0691 |
| 2021/0136802 A1* | 5/2021 | Cirik | H04B 7/0695 |
| 2021/0153217 A1 | 5/2021 | Zhou et al. | |
| 2021/0159966 A1* | 5/2021 | Xi | H04B 7/0691 |
| 2021/0329546 A1 | 10/2021 | Wang et al. | |
| 2022/0022207 A1* | 1/2022 | Matsumura | H04W 72/23 |
| 2022/0173848 A1 | 6/2022 | Guan et al. | |
| 2022/0279450 A1 | 9/2022 | Zhang et al. | |
| 2022/0279460 A1* | 9/2022 | Zhang | H04W 16/28 |
| 2023/0083208 A1* | 3/2023 | Zhang | H04W 72/232 370/329 |

FOREIGN PATENT DOCUMENTS

| | | |
|---|---|---|
| WO | WO-2019099659 A1 | 5/2019 |
| WO | WO2019165224 A1 | 8/2019 |
| WO | WO2021042361 A1 | 3/2021 |

OTHER PUBLICATIONS

International Preliminary Report on Patentability—PCT/US2020/057152, The International Bureau of WIPO—Geneva, Switzerland, Jun. 2, 2022.
International Search Report and Written Opinion—PCT/US2020/057152—ISA/EPO—Mar. 16, 2021.
Partial International Search Report—PCT/US2020/057152—ISA/EPO—Feb. 1, 2021.
Research in Motion, UK Limited: "UL Secondary Component Carrier Activation/Deactivation", 3GPP TSG RAN WG2 Meeting #70, 3GPP Draft; R2-102969 UL SCC ACT and DEACT, 3rd Generation Partnership Project (3GPP), Mobile Competence Centre; 650, Route Des Lucioles; F-06921 Sophia-Antipolis Cedex; France, vol. RAN WG2, No. Montreal, Canada; May 10, 2010, May 4, 2010 (May 4, 2010), pp. 1-3, XP050423206, [retrieved on May 4, 2010] chapter 3; p. 1.
Taiwan Search Report—TW109137064—TIPO—Nov. 2, 2023.

\* cited by examiner

COMMON DEFAULT BEAM PER COMPONENT CARRIER GROUP

CROSS REFERENCE

The present application for patent is a Continuation of U.S. patent application Ser. No. 17/026,023 by ZHOU et al., entitled "COMMON DEFAULT BEAM PER COMPONENT CARRIER GROUP" filed Sep. 18, 2020, which claims the benefit of U.S. Provisional Patent Application No. 62/938,208 by ZHOU et al., entitled "COMMON DEFAULT BEAM PER COMPONENT CARRIER GROUP," filed Nov. 20, 2019, each of which are assigned to the assignee hereof, and each of which are expressly incorporated by reference herein.

BACKGROUND

The following relates generally to wireless communications, and more specifically to common default beam per component carrier (CC) group.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Various communication systems may use different frequency bands depending on the particular needs of the system. For example, a millimeter wave frequency band (which may be between 30 to 300 GHz) may be used where a large concentration of UEs are relatively close to one another and/or where a relatively large amount of data is to be transferred from a base station to one or more UEs, or vice versa. Millimeter wavelength signals, however, may frequently experience high path loss, and as a result, directional beam forming techniques may be used for uplink and/or downlink transmissions between a base station and a UE using millimeter wavelength frequencies. Directional beamforming techniques may enable a transmitter to transmit a signal onto a particular propagation path, and may enable a receiver to receive a signal from a particular propagation path.

SUMMARY

The described techniques relate to improved methods, systems, devices, and apparatuses that support common default beam per component carrier (CC) group. Generally, the described techniques provide for identification or determination of a common default beam for a CC group (e.g., such that all CCs of a CC group are associated with a same default beam). For example, a CC group may be configured or established to include one or more CCs (e.g., for carrier aggregation). In some cases, each CC group may share a same analog beamformer. As such, a beam (e.g., a default uplink/downlink beam) may be established as default or common across CCs of a CC group (e.g., versus default beams being configured or established for individual CCs of a CC group). A default beam (e.g., a default uplink/downlink beam) of a CC group may include or refer to a default downlink shared channel beam (e.g., default physical downlink shared channel (PDSCH) beam), a sounding reference signal (SRS) beam, a default physical downlink control channel (PDCCH) beam, etc.

According to some aspects, a default beam for a CC group may be set as the default beam of some CC within that CC group. For example, a default beam may be determined for some CC of a CC group, and the default beam may be applied for all other CCs within the CC group. In some cases, the CC used to determine or identify a default beam for the CC group may be established (e.g., preconfigured or determined by) the network or the wireless communications system (e.g., in some cases a CC with a lowest CC index within a CC group may be used by communicating devices to determine a default beam for the CC group). In some cases, the CC used to determine or identify a default beam for the CC group may be selected by a first device, and the first device may then indicate the selected CC to a second device (e.g., such that the first and second device may use the same CC of a CC group to identify the default beam of the CC group).

According to some aspects, a default beam for a CC group may be indicated by a base station. For example, in some cases, radio resource control (RRC) signaling, a medium access control (MAC) control element (CE), downlink control information (DCI), or any combinations thereof, may be used to indicate a default beam for a CC group. In some cases, a default beam may be identified based on a common transmission configuration indication (TCI) state or spatial relation information. In some examples (e.g., in scenarios where a base station employs multiple transmission/reception points (TRPs)), a common default beam multiple default beams for simultaneous receive/transmit communications may be established (e.g., a default beam may be identified/established for each TRP).

A method of wireless communication at a first device is described. The method may include identifying a set of component carriers in a component carrier group, identifying a default beam applicable for each component carrier of the set of component carriers in the component carrier group, and communicating with a second device based on the identified default beam and at least one component carrier of the set of component carriers.

An apparatus for wireless communication at a first device is described. The apparatus may include a processor, memory coupled with the processor, and instructions stored in the memory. The instructions may be executable by the processor to cause the apparatus to identify a set of component carriers in a component carrier group, identify a default beam applicable for each component carrier of the set of component carriers in the component carrier group, and communicate with a second device based on the identified default beam and at least one component carrier of the set of component carriers.

Another apparatus for wireless communication at a first device is described. The apparatus may include means for identifying a set of component carriers in a component carrier group, identifying a default beam applicable for each component carrier of the set of component carriers in the component carrier group, and communicating with a second device based on the identified default beam and at least one component carrier of the set of component carriers.

A non-transitory computer-readable medium storing code for wireless communication at a first device is described. The code may include instructions executable by a processor to identify a set of component carriers in a component carrier group, identify a default beam applicable for each component carrier of the set of component carriers in the component carrier group, and communicate with a second device based on the identified default beam and at least one component carrier of the set of component carriers.

Some examples of the method, apparatuses, and non-transitory computer-readable medium described herein may further include operations, features, means, or instructions for transmitting an indication of the identified set of component carriers included in the component carrier group. Some examples of the method, apparatuses, and non-transitory computer-readable medium described herein may further include operations, features, means, or instructions for receiving an indication of the set of component carriers included in the component carrier group, where the set of component carriers in the component carrier group may be identified based on the received indication. In some examples of the method, apparatuses, and non-transitory computer-readable medium described herein, identifying the default beam may include operations, features, means, or instructions for identifying the default beam based on a lowest control resource set identifier.

In some examples of the method, apparatuses, and non-transitory computer-readable medium described herein, identifying the default beam may include operations, features, means, or instructions for identifying the default beam based on a configured primary cell. In some examples of the method, apparatuses, and non-transitory computer-readable medium described herein, identifying the default beam may include operations, features, means, or instructions for identifying the default beam based on a configured secondary cell. In some examples of the method, apparatuses, and non-transitory computer-readable medium described herein, identifying the default beam may include operations, features, means, or instructions for identifying the default beam based on a lowest component carrier index associated with the set of component carriers.

In some examples of the method, apparatuses, and non-transitory computer-readable medium described herein, identifying the default beam may include operations, features, means, or instructions for identifying the default beam based on a highest component carrier index associated with the set of component carriers. Some examples of the method, apparatuses, and non-transitory computer-readable medium described herein may further include operations, features, means, or instructions for identifying one or more transmission configuration indication states active for a cell associated with the second device, where the default beam may be identified based on a lowest transmission configuration indication state identifier of the identified one or more transmission configuration indication states active for the cell.

Some examples of the method, apparatuses, and non-transitory computer-readable medium described herein may further include operations, features, means, or instructions for transmitting an indication of the identified default beam to the second device, where the communicating may be based on the transmitted indication. In some examples of the method, apparatuses, and non-transitory computer-readable medium described herein, the indication of the identified default beam includes a common transmission configuration indication state. In some examples of the method, apparatuses, and non-transitory computer-readable medium described herein, the indication of the identified default beam includes spatial relationship information. In some examples of the method, apparatuses, and non-transitory computer-readable medium described herein, transmitting the indication of the identified default beam may include operations, features, means, or instructions for transmitting a set of multiple default beams for simultaneous transmit/receive communications with the second device. In some examples of the method, apparatuses, and non-transitory computer-readable medium described herein, each default beam of the set of multiple default beams corresponds to a transmission/reception point of the first device.

In some examples of the method, apparatuses, and non-transitory computer-readable medium described herein, identifying the default beam may include operations, features, means, or instructions for identifying the default beam based on spatial division multiplexing pattern, a time division multiplexing pattern, a frequency division multiplexing pattern, or some combination thereof. Some examples of the method, apparatuses, and non-transitory computer-readable medium described herein may further include operations, features, means, or instructions for receiving an indication of the default beam from the second device, where the default beam may be identified based on the received indication. In some examples of the method, apparatuses, and non-transitory computer-readable medium described herein, the set of component carriers share an analog beamformer at the first device. In some examples of the method, apparatuses, and non-transitory computer-readable medium described herein, the set of component carriers share an analog beamformer at the second device. In some examples of the method, apparatuses, and non-transitory computer-readable medium described herein, the default beam includes a default uplink beam, a default downlink beam, or both.

Some examples of the method, apparatuses, and non-transitory computer-readable medium described herein may further include operations, features, means, or instructions for determining a path loss for the default beam, and associating the determined path loss to one or more other component carriers of the set of component carriers. Some examples of the method, apparatuses, and non-transitory computer-readable medium described herein may further include operations, features, means, or instructions for associating the determined path loss across component carriers of a transmission/reception point affiliated with the default beam.

DETAILED DESCRIPTION

Figure 1:
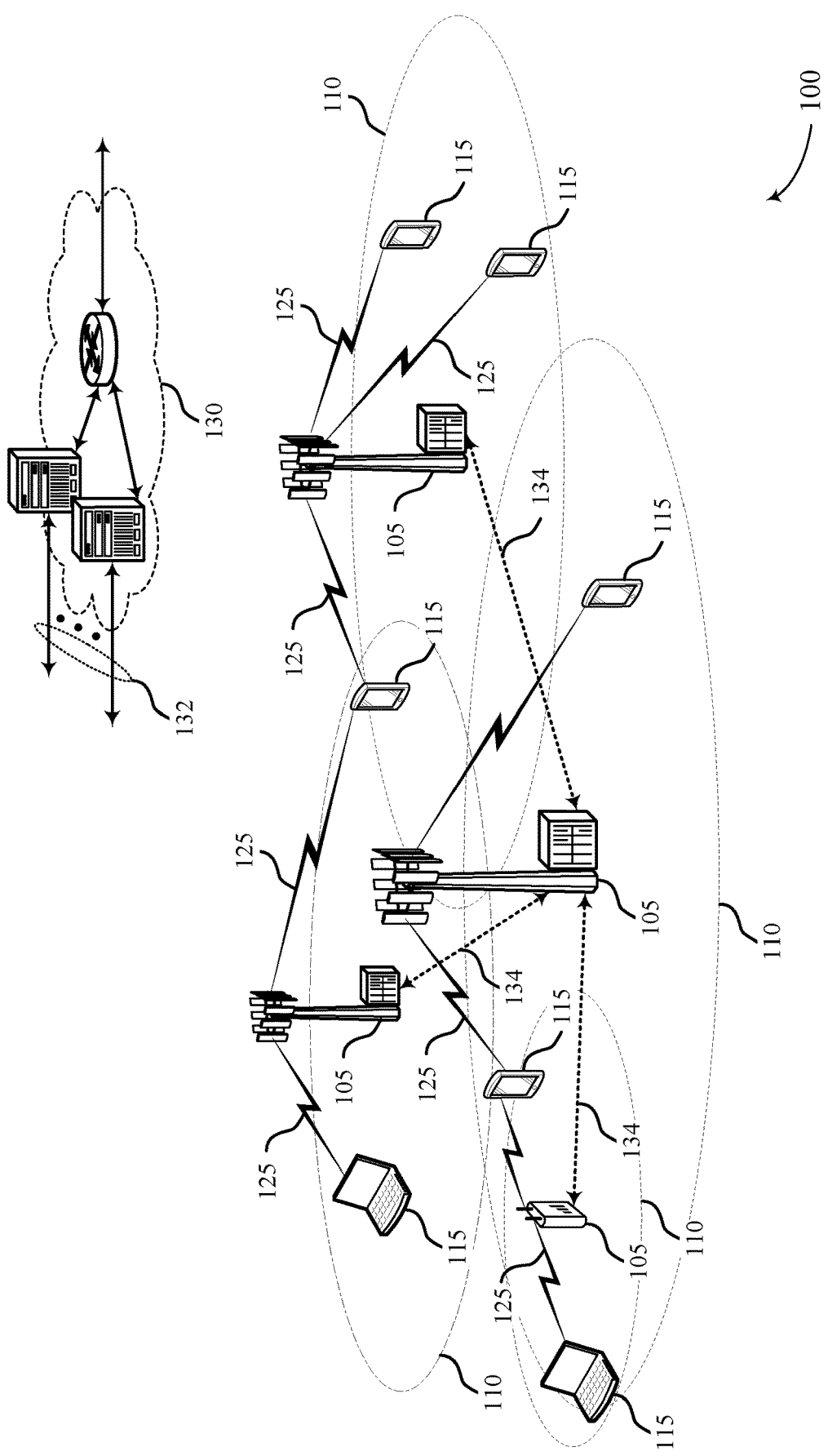
FIG. 1 illustrates an example of a system for wireless communications that supports common default beam per component carrier (CC) group in accordance with aspects of the present disclosure.

Various communication systems may use different frequency bands depending on the particular needs of the system. For example, a millimeter wave frequency band (which may be between 30 to 300 GHz) may be used where a large concentration of user equipment (UEs) are relatively close to one another and/or where a relatively large amount of data is to be transferred from a base station to one or more UEs, or vice versa. Millimeter wavelength signals, however, may experience high path loss, and as a result, directional beam forming techniques may be used for uplink and/or downlink transmissions between a base station and a UE using millimeter wavelength frequencies. Directional beamforming techniques may enable a transmitter to transmit a signal onto a particular propagation path, and may enable a receiver to receive a signal from a particular propagation path (e.g., as more than one signal propagation path may exist between a UE and a base station).

For example, a base station and a UE may each use multiple antennas when communicating with each other. Multiple antennas at the base station and UE may be used to take advantage of antenna diversity schemes that may improve communication rates and/or throughput reliability. Different types of techniques may be used to implement an antenna diversity scheme. For example, transmit diversity may be applied to increase the signal to noise ratio (SNR) at the receiver for a single data stream. Spatial diversity may be applied to increase the data rate by transmitting multiple independent streams using multiple antennas. Receive diversity may be used to combine signals received at multiple receive antennas to improve received signal quality and increased resistance to fading.

Further, some wireless communications systems may support communication with UEs on multiple cells or carriers, a feature which may be referred to as carrier aggregation or multi-carrier operation. A UE may be configured with multiple downlink component carriers (CCs) and one or more uplink CCs according to a carrier aggregation configuration. Carrier aggregation may be used with both frequency division duplexing (FDD) and time division duplexing (TDD) CCs. In some cases, a UE may receive a physical downlink control channel (PDSCH) transmission that includes control information for decoding a subsequent physical downlink shared channel (PDSCH) transmission. The UE may decode control information before receiving the PDSCH transmission and use the control information to configure one or more parameters for receiving and/or decoding the PDSCH transmission. In some cases, the base station may send the PDSCH transmission close in time to or overlapping with the PDCCH transmission. If the offset between the PDCCH transmission and the PDSCH transmission is below a time threshold, the UE may not be able to decode to control information in the PDCCH with enough time to configure its receive parameters to receive and decode the PDSCH transmission. Accordingly, the UE and base station may configure a default beam for buffering the PDSCH transmission while the UE receives and decodes the PDCCH control information.

However, in some cases, a default beam may be determined individually for each CC, and in the case that the default beams are not compatible (e.g., in cases where default beams are different across CCs at a given time, in cases where default beams are unable to be concurrently received at the UE, etc.), the UE 115 may prioritize one default beam based on its own implementation (which may result in other CCs using, or being transmitted by a base station assuming, a different beam than the default beam prioritized/used by the UE 115). For example, a UE may use an antenna panel that may be able to transmit/receive one beam at a time, and thus if CCs at a given time have default beams that use a same antenna panel at the UE, the UE may be unable to concurrently communicate using both CCs (or the UE may communicate using a default beam of a first CC for a second CC, and the second CC may not be associated with the default beam of the first CC).

As such, according to the techniques described herein, wireless communications systems may support identification or determination of a common default beam for a CC group such that all CCs of a CC group may be associated with a same default beam. For example, a CC group may be configured or established to include one or more CCs (e.g., for carrier aggregation). In some cases, each CC group may share a same analog beamformer. As such, a beam (e.g., a default uplink/downlink beam) may be established as default or common across CCs of a CC group versus default beams being configured or established for individual CCs. Such an established default beam of a CC group may include or refer to a default downlink shared channel beam (e.g., a default PDSCH beam), a default sounding reference signal (SRS) beam, a default PDCCH beam, etc. Further, a default beam for a CC group may include or refer to a default downlink beam, a default uplink beam, and/or a default beam used for uplink and downlink.

Such techniques may support efficient communications between a UE and a base station to improve throughput or improve the reliability of communications. For instance, when operating with CCs of a CC group, a UE may use a same default beam across CCs of the CC group at a given time, resulting in improved throughput, improved reliability (e.g., a higher chance that data is received by the UE), etc. Techniques as discussed herein may further enhance such reliability, throughput, or both.

Aspects of the disclosure are initially described in the context of a wireless communications system. An example control resource set (CORESET) configuration and an example process flow illustrating aspects of the techniques discussed herein are then described. Aspects of the disclosure are further illustrated by and described with reference to apparatus diagrams, diagrams, and flowcharts that relate to common default beam per CC group.

FIG. 1 illustrates an example of a wireless communications system 100 that supports common default beam per CC group in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers (CCs) and one or more uplink CCs according to a carrier aggregation configuration. Carrier aggregation may be used with both FDD and TDD CCs. In some cases, a default beam may be determined individually for each CC, and in the case that the default beams are not compatible (e.g., in cases where default beams are different across CCs at a given time, in cases where default beams are unable to be concurrently received at the UE 115, etc.), the UE 115 may prioritize one default beam based on its own implementation (which may result in other CCs using, or being transmitted by a base station 105 assuming, a different beam than the default beam prioritized/used by the UE 115).

In some deployments, base stations 105 may support communications using one or more transmission reception points (TRPs) to improve reliability, coverage, capacity performance, or combinations thereof. In some cases, UEs 115 may establish beamformed communications links with multiple TRPs to simultaneously receive and transmit communications with the multiple TRPs. For example, a UE 115 may receive a physical downlink control channel (PDCCH), decode control information from the PDCCH and decode a subsequent physical downlink shared channel (PDSCH) transmission using the decoded control information.

When a set of TCI-state IDs for PDSCH are activated by a MAC CE for a set of CCs/BWPs at least for the same band, and where the applicable list of CCs is indicated by RRC signaling, the same set of TCI-state IDs may be applied for BWPs in the indicated CCs. In some cases, combinations of CCs may be configured by RRC and relevant UE capability (e.g., combinations of CCs may be configured by RRC based on UE capabilities pertaining to CC usage, UE capabilities pertaining to carrier aggregation, etc.). In some cases, for the purpose of simultaneous TCI state activation across multiple CCs/BWPs, up to two lists of CCs may be configured by RRC per UE 115, and the applied list may be determined by the indicated CC in the MAC CE. In some cases, a UE 115 may not be configured with overlapped CC in multiple RRC-configured lists of CCs.

When a spatial relation information is activated for a semi-periodic/aperiodic sounding reference signal (SRS) resource by a MAC CE for a set of CCs/BWPs at least for the same band, and where the applicable list of CCs is indicated by RRC signaling, the spatial relation information may be applied for the SP/AP SRS resource(s) with the same SRS resource ID for all the BWPs in the indicated CCs. In some cases, wireless communications system 100 may support inter-band carrier aggregation for such features. In some cases, UE 115 may indicate an applicable list of bands for the feature of single MAC-CE to activate the same SRS resource IDs for multiple CCs/BWPs (e.g., in a capability report). For the purpose of simultaneous spatial relation update across multiple CCs/BWPs, up to two lists of CCs may be configured by RRC per UE 115, and the applied list may be determined by the indicated CC in the MAC CE. In some cases, a UE 115 may not be configured with overlapped CC in multiple RRC-configured lists of CCs. In some cases, the lists may independent from those for simultaneous TCI state activation.

In some wireless communications systems, a default PDSCH beam may be used to receive PDSCH when the scheduling offset between DCI and scheduled PDSCH is less than the beam switch latency (where the beam switch latency may be reported as a UE 115 capability). When the CC has CORESET configured, default PDSCH beam may be determined by the Quasi Co-Location (QCL) assumption for receiving CORESET with lowest CORESET ID in latest monitored slot on the same CC. When the CC has no CORESET configured, the default PDSCH beam may be determined by the QCL-TypeD reference signal (RS) in the activated PDSCH TCI state with lowest TCI state ID on the same CC.

In some wireless communications systems, determination of a default SRS/PUCCH beam follows the operations or techniques for determination of a default PDSCH beam (e.g., if spatial relation information is not configured for SRS/PUCCH). The default spatial relation for dedicated-PUCCH/SRS for a CC (at least when no pathloss reference signals are configured by RRC) may be determined by a default TCI state or QCL assumption of PDSCH. For example, the default spatial relation for dedicated-PUCCH/SRS for a CC, in cases when CORESET(s) are configured on the CC, may be determined by the CORESET with the lowest ID in the most recent monitored downlink slot. The default spatial relation for dedicated-PUCCH/SRS for a CC, in cases when any CORESETs are not configured on the CC, may be determined by the activated TCI state with the lowest ID applicable to PDSCH in the active downlink BWP (DL-BWP) of the CC. In some cases, such may apply at least for UEs 115 supporting beam correspondence, for the single TRP cases, etc.

As discussed herein, wireless communications system 100 may support identification or determination of a common default beam for a CC group (e.g., such that all CCs of a CC group may be associated with a same default beam). For example, a CC group may be configured or established to include one or more CCs. In some cases, each CC group may share a same analog beamformer. As such, a beam (e.g., a default uplink/downlink beam) may be established as default or common across CCs of a CC group versus default beams being configured or established for individual CCs. Such an established default beam of a CC group (e.g., a default beam common to all CCs of a CC group) may include or refer to a default downlink shared channel beam (e.g., a default PDSCH beam), a default sounding reference signal (SRS) beam, a default PDCCH beam, etc. Further, a default beam for a CC group may include or refer to a default downlink beam, a default uplink beam, and/or a default beam used for uplink and downlink.

According to some aspects, a default beam for a CC group may be set as the default beam of some CC within that CC group. For example, a default beam may be determined for some CC of a CC group according to any of the techniques described herein, and the default beam may be applied for all other CCs within the CC group. In some cases, the CC used to determine or identify a default beam for the CC group may be established (e.g., preconfigured or determined by) the network or the wireless communications system (e.g., in some cases a CC with a lowest CC index within a CC group or a CC with a highest CC index within a CC group may be used by communicating devices to determine a default beam for the CC group). In some cases, the CC used to determine or identify a default beam for the CC group may be selected by a first device (e.g., by a UE 115 or a base station 105), and the first device may then indicate the selected CC to a second device (e.g., such that the first and second device may use the same CC of a CC group to identify the default beam of the CC group).

According to some aspects, a default beam for a CC group may be indicated by a base station. For example, in some cases, radio resource control (RRC) signaling, a medium access control (MAC) control element (CE), downlink control information (DCI), or any combinations thereof, may be used to indicate a default beam for a CC group. In some cases, a default beam may be identified based on a common transmission configuration indication (TCI) state or spatial relation information. In some examples (e.g., in scenarios where a base station employs multiple transmission/reception points (TRPs)), a common default beam for simultaneous receive/transmit communications may be established (e.g., a default beam may be identified/established for each TRP).

Figure 2:
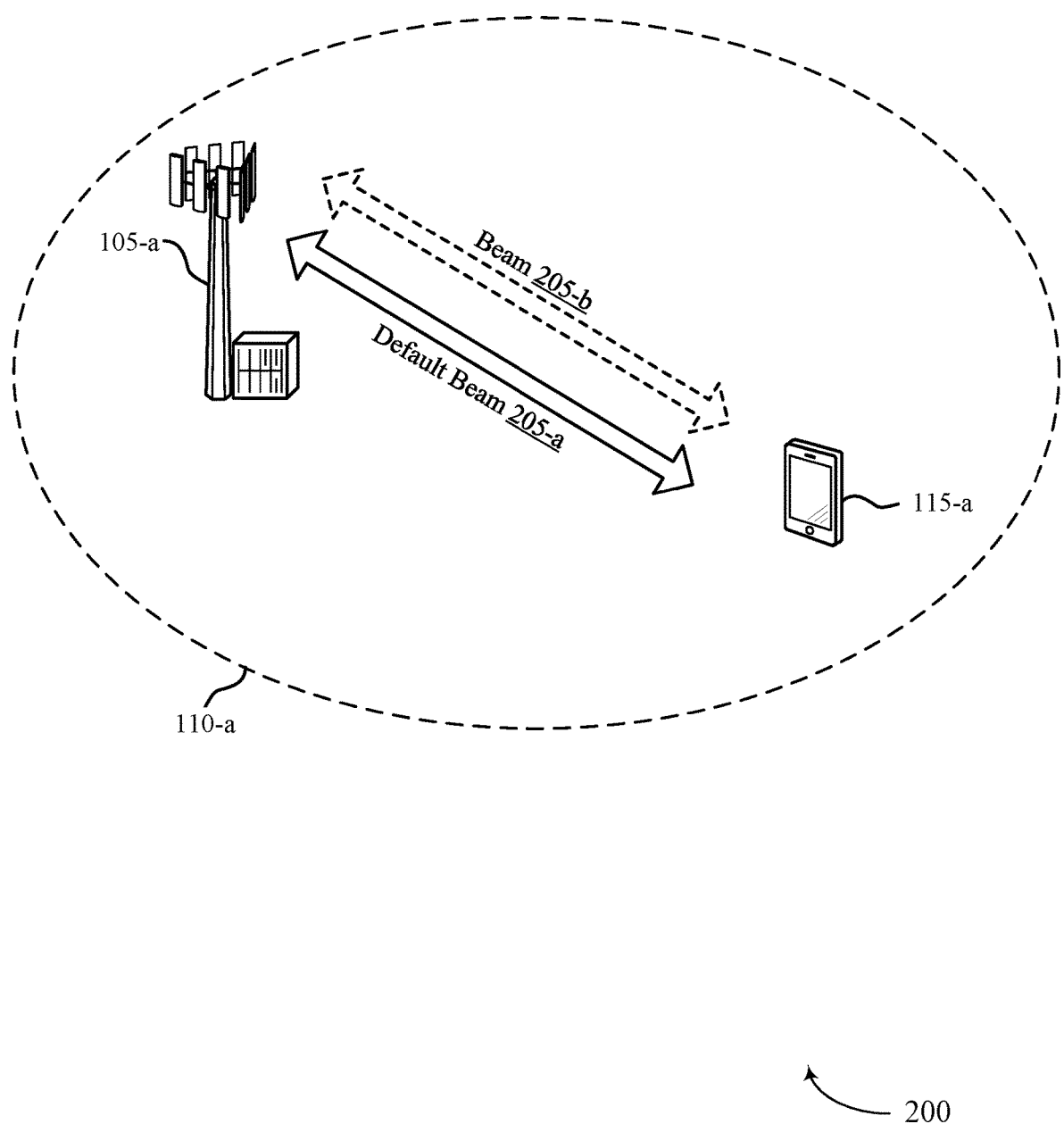
FIG. 2 illustrates an example of a wireless communications system that supports common default beam per CC group in accordance with aspects of the present disclosure.

FIG. 2 illustrates an example of a wireless communications system 200 that supports common default beam per CC group in accordance with aspects of the present disclosure. In some examples, wireless communications system 200 may implement aspects of wireless communications system 100. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a geographical coverage area 110-a, which may be an example of a coverage area 110 described with reference to FIG. 1.

Generally, the described techniques provide for configuration, identification, determination, etc. of default beams for a CC group (e.g., such that all CCs of a CC group are associated with a same default beam). For example, each CC group may share a same analog beamformer (e.g., at UE 115-a). As such, a beam 205 (e.g., a default uplink/downlink beam) may be established as a default or common across CCs of a CC group (versus default beams being configured or established for individual CCs of a CC group). For example, in cases where two CCs are part of a CC group, both of the two CCs may be associated with a same default beam 205-a rather than a first CC of the CC group being associated with a default beam 205-a and a second CC of the CC group being associated with a default beam 205-b. A default beam 205-a (e.g., a default uplink/downlink beam) of a CC group may be used for a default downlink shared channel beam (a default PDSCH beam), for a SRS beam, for a default PDCCH beam, etc. In some cases, a default uplink beam and a default downlink beam may be used for a CC group. In some cases, a same beam may be used for both uplink and downlink for a CC group.

As discussed herein, in the group CC based beam update, each CC group may share a same analog beamformer (e.g., a CC group may include one or more CCs for communications between UE 115-a and base station 105-a). In cases where default beams are employed independently for each CC, if a default beam (e.g., a default downlink/uplink beam) is different across CCs at a given time, a UE may resort to prioritization of some CCs (as the UE may default to one beam at a given time). As such, according to the techniques described herein, a default beam 205-a (e.g., a default uplink beam and/or a default downlink beam) may be employed as a common (or same) uplink/downlink beam per CC group. Wireless communications system 200 may employ (e.g., configure, establish, etc.) a common downlink/uplink default beam used across multiple CCs (and/or bandwidth parts (BWPs)). For example, wireless communications system 200 may employ a common downlink/uplink default beam 205-a used across all CCs within (comprised in) a CC group. Such unification of CCs may reduce overhead used to configure multiple CCs in a CC group, may reduce the number of beams UE 115-a may prioritize for CCs within the CC group, etc. In some cases, multiple CCs/BWPs may share a same analog beamformer (which may be reported by UE 115-a or indicated by base station 105-a).

According to some aspects, a default beam 205-a for a CC group may be set as the default beam of some CC within that CC group. For example, a default beam 205-a may be determined for some CC of a CC group, and the default beam 205-a may be applied for all other CCs within the CC group. In some cases, the CC used to determine or identify a default beam 205-a for the CC group may be established (e.g., preconfigured or determined by) the network or the wireless communications system 200. For example, in some cases, a CC with a lowest CC index within a CC group may be used by communicating devices (e.g., base station 105-a and UE 115-a) to determine a default beam 205-a for the CC group (e.g., a default beam 105-a associated with the CC with the lowest CC index within the CC group may be used to identify the default beam 105-a associated with each CC of the CC group). In some cases, a CC with a highest CC index within a CC group may be used by communicating devices (e.g., base station 105-a and UE 115-a) to determine a default beam 205-a for the CC group. In some cases, a secondary cell (SCell) and/or primary cell (PCell) in a CC group may be used by communicating devices (e.g., base station 105-a and UE 115-a) to determine a default beam 205-a for the CC group.

In some cases, the CC used to determine or identify a default beam for the CC group may be selected by a first device, and the first device may then indicate the selected CC to a second device (such that the first and second device may use the same CC of a CC group to identify the default beam of the CC group). For example, a CC from a CC group may be selected by UE 115-a, and UE 115-a may transmit an indication of the CC to base station 105-a (such that both UE 115-a and base station 105-a may use the CC selected by UE 115-a to determine a default beam 205-a for the CC group). In some examples, a CC from a CC group may be selected by base station 105-a, and base station 105-a may transmit an indication of the CC to UE 115-a (such that both UE 115-a and base station 105-a may use the CC selected by UE 115-a to determine a default beam 205-a for the CC group). In some cases, a device (e.g., UE 115-a or base station 105-a) indicating which CCs make up a CC group (e.g., a device indicating that a CC1, a CC2, and a CC3 are within a CC group) may further indicate which CC of the CC group is used for default beam 205-a identification.

In some examples, base station 105-a may be associated with multiple TRPs, and a default downlink/uplink beam per TRP may follow a lowest CORESET ID of same TRP in multi-DCI based TRP. For example, UE 115-a may be configured with a subset of CORESETs for each TRP. In some cases, a first beam for a first TRP may be determined based on a lowest CORESET ID of the first TRP, and then a second beam for a second TRP may be determined based on a lowest CORESET ID of the second TRP.

According to some aspects, a default beam for a CC group may be indicated by a base station. For example, in some cases, radio resource control (RRC) signaling, a medium access control (MAC) control element (CE), downlink control information (DCI), or any combinations thereof, may be used to indicate a default beam for a CC group. In some cases, a default beam may be signaled by a common transmission configuration indication (TCI) state or spatial relation information. In some examples, a common default beam (e.g., common downlink/uplink default beam) may have multiple default beams for simultaneous receive/transmit communications (e.g., in scenarios where a base station employs multiple TRPs, default beam 205-a, for uplink and/or downlink, may be per TRP).

In some examples, the common downlink/uplink default beam may be signaled by a common TCI state ID or spatial relation information (e.g., CCs per CC group may have common or different pools of configuration TCI states or spatial relation information). In some cases, the common downlink/uplink default beam may have multiple default beams for simultaneous receive/transmit (e.g., in multiple TRP configurations). For example, the common set of multiple downlink/uplink default beams may be identified by a set of common TCI state IDs or spatial relation information IDs, which may be further mapped to a common TCI or spatial relation code point in single-DCI based TRP. In some cases, the common downlink/uplink default beam may have common spatial division multiplexing (SDM) pattern, common time division multiplexing (TDM) pattern, common frequency division multiplexing (FDM) pattern, or some combination thereof (e.g., a default beam 1 and a default beam 2 may be used on odd symbols in every slot and a default beam 3 and a default beam 4 may be used on even symbols in every slot, across all CCs in the same group).

In some examples, UE 115-a may determine a path loss from downlink reference signals associated with the default beam of a CC group. From this path loss of the default beam, UE 115-a may associate this path loss to one or more component carriers of the CC group apart from the default beam. In another example UE 115-a may associate the path loss of the default beam across component carriers of a transmission/reception point affiliated with the default beam.

Figure 3:
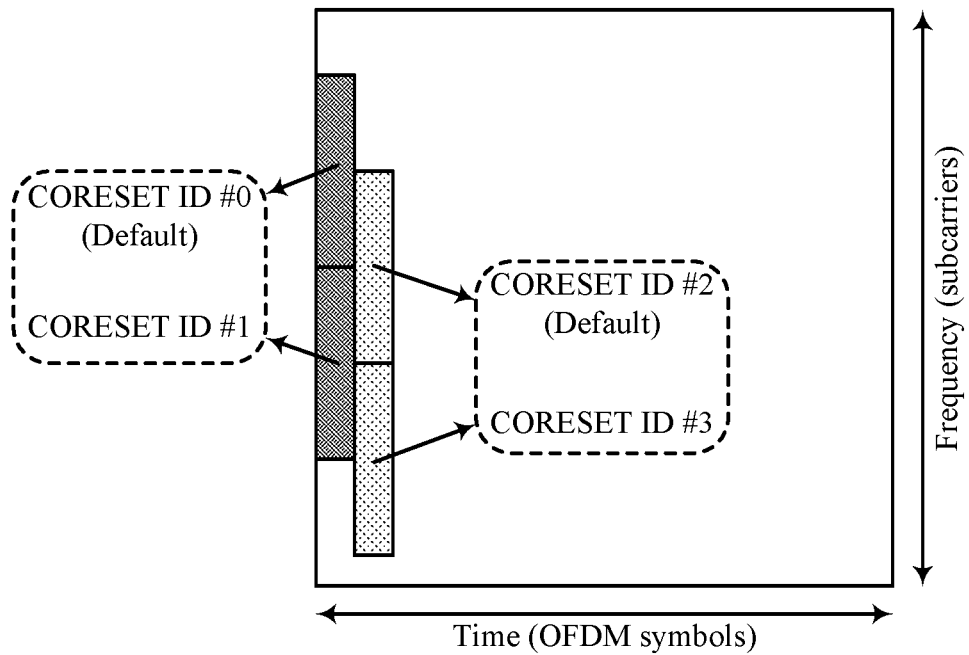
FIG. 3 illustrates an example of a control resource set (CORESET) configuration that supports common default beam per CC group in accordance with aspects of the present disclosure.

FIG. 3 illustrates an example of a CORESET configuration 300 that supports common default beam per CC group in accordance with aspects of the present disclosure. In some examples, CORESET configuration 300 may implement aspects of wireless communications system 100 and/or wireless communications system 200. In this example, CORESET configuration 300 may be monitored by a UE for control information from multiple TRPs in accordance with aspects of the present disclosure. For example, the UE may monitor CORESETs 305 (e.g., with IDs #0 and #1) for control information from a first TRP and CORESETs 310 (e.g., with IDs #2 and #3) for control information from a second TRP. In other examples, the number of CORESETs assigned to each TRP may be different. In some examples, the lowest CORESET ID of each group of CORESET 305 and CORESET 310 may be used to determine a default beam.

As indicated above, in some cases, UE 115-a may be unable to concurrently receive default receive beams, such as if multiple default beams (e.g., different default beams associated with different CCs of a CC group, different default beams associated with different TRPs, etc.) are associated with a same antenna panel. For example, in some cases, multiple TRPs may be configured for simultaneous transmissions to a UE, where the UE is to simultaneously receive the multiple transmissions from the multiple TRPs.

In some cases, the default beam for a first TRP (TRP 1) may be based on a configured CORESET or multiple CORESETs 305 that the first TRP may monitor for control information. For example, the default beam may be determined based on a CORESET with a lowest CORESET ID, and a TCI state associated with the CORESET may be used to derive the corresponding beamforming parameters. For example, the default receive beam may be derived from quasi colocation (QCL) information of the identified CORESET. In some cases, each TRP (e.g., TRP 1 and TRP 2) may be configured with a default beam configuration. In some cases, a common default beam for a CC group may be determined based on a CORESET ID (e.g., a lowest CORESET ID) of CORESET 305 and CORESET 310, based on a CORESET ID (e.g., a lowest CORESET ID) of each group of CORESET 305 and CORESET 310, etc.

Figure 4:
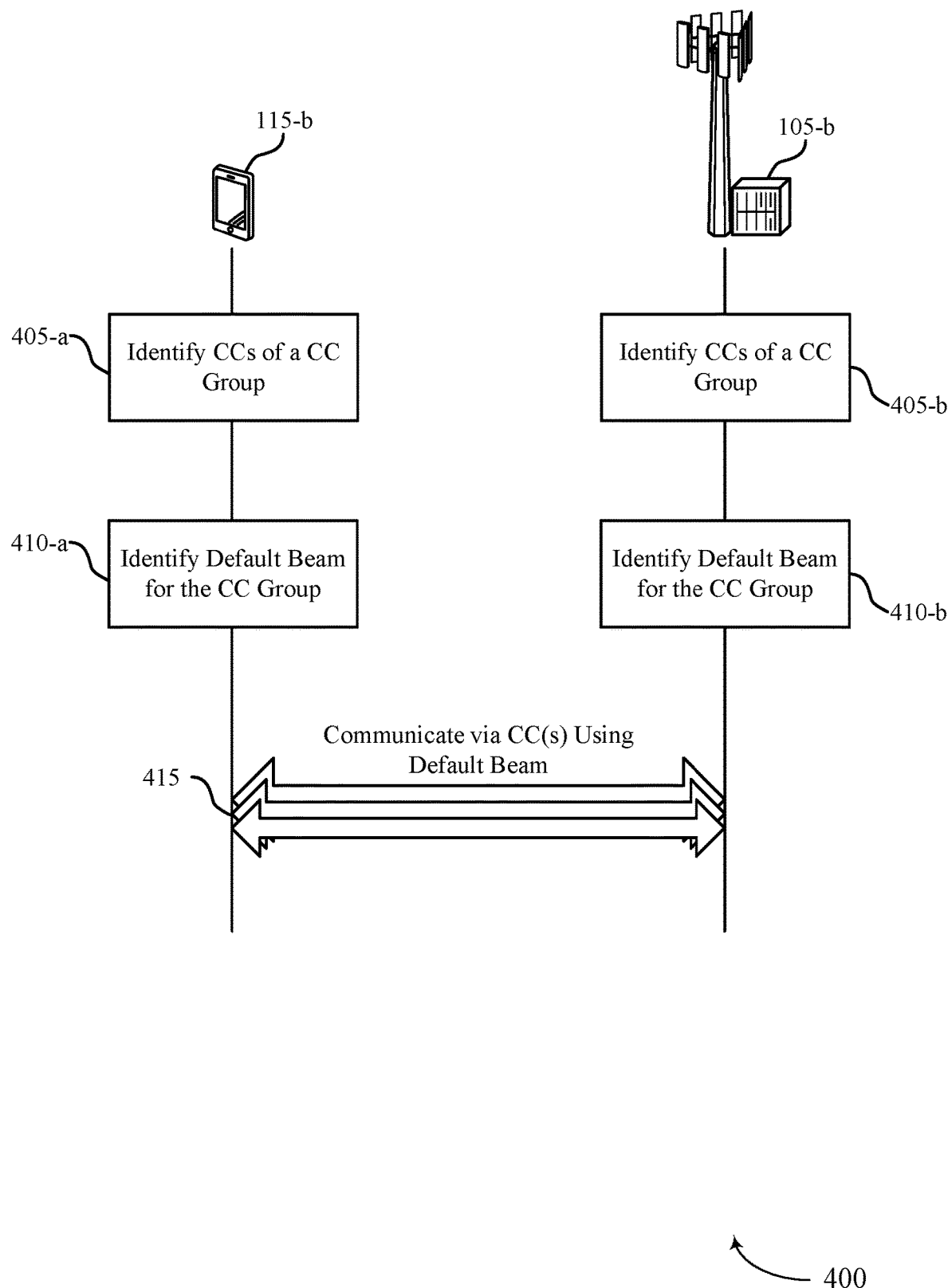
FIG. 4 illustrates an example of a process flow that supports common default beam per CC group in accordance with aspects of the present disclosure.

FIG. 4 illustrates an example of a process flow 400 that supports common default beam per CC group in accordance with aspects of the present disclosure. In some examples, process flow 400 may implement aspects of wireless communications system 100, wireless communications system 200, and/or CORESET configuration 300. The process flow 400 includes functions and communications implemented by base station 105-b and UE 115-b in the context of common default beam per CC group (e.g., for more efficient analog beamforming operations, more efficient CC utilization, etc.).

In the following description of the process flow 400, the operations between by UE 115-b and base station 105-b may be transmitted in a different order than the order shown, or the operations may be performed in different orders or at different times. Certain operations may also be left out of the process flow 400, or other operations may be added to the process flow 400. It is to be understood that while UE 115-b and base station 105-b are shown performing a number of the operations of process flow 400, any wireless device may perform the some or all of the operations shown.

At 405, a device may identify a set of CCs in a CC group. For example, at 405-a, UE 115-b may identify a set of CCs in a CC group. Further, at 405-b, base station 105-b may identify the set of CCs in the CC group. For example, in some cases either UE 115-b or base station 105-b may determine the set of CCs in the CC group, and the UE 115-b or base station 105-b may transmit an indication of the identified CCs to the other device (e.g., to the other device of UE 115-b or base station 105-b). As such, in cases where one of UE 115-b or base station 105-b receives an indication of the set of CCs in a CC group, such a device may identify the set of CCs in the CC group based on the received indication. In some cases, a CC group (e.g., a set of CCs in a CC group) may be identified based on a carrier aggregation configuration, based on channel conditions, based on resource utilization within a wireless communications system, based on capabilities of the UE 115-b (e.g., based on a number of uplink CCs supported by UE 115-b, based on a number of downlink CCs supported by UE 115-b, etc.), based on analog beamforming panels, antenna panels, antenna arrays, etc. of the UE 115-a and/or base station 105-a, etc. For example, in some cases, the set of CCs in the CC group may share an analog beamformer at the UE 115-b, at the base station 105-b, or both.

At 410, a device may identify a default beam applicable for each CC of the set of CCs in the CC group (e.g., a device may identify a common default beam applicable for all CCs of a CC group). For example, at 410-a, UE 115-b may identify a default beam applicable for each CC of the set of CCs in the CC group. Further, at 410-b, base station 105-b may identify a default beam applicable for each CC of the set of CCs in the CC group. UE 115-b and base station 105-b may identify the default beam (the common default beam) applicable the CC group (for each CC of the set of CCs in the CC group) according to the various techniques described herein. For example, UE 115-b and/or base station 105-b may identify the default beam for the CC group based on a lowest CORESET ID (as described in more detail herein, for example, with reference to FIGS. 1-3), based on a configured primary cell (PCell)/secondary cell (SCell) (as described in more detail herein, for example, with reference to FIGS. 1-3), based on a lowest CC index/highest CC index associated with the set of CCs (as described in more detail herein, for example, with reference to FIGS. 1-3), etc. In some cases, UE 115-b may identify one or more TCI states active for a cell associated with base station 105-b, where the default beam may be identified based at least in part on a lowest TCI state ID of the identified one or more TCI states active for the cell.

In some examples, base station 105-b may determine or identify the default beam, and the base station 105-b may transmit an indication of the identified default beam to UE 115-b. For example, base station 105-b may transmit RRC signaling, a MAC CE, DCI, or any combinations thereof, to configure/indicate a default beam for a CC group (e.g., to UE 115-b). In some cases, a default beam may be identified based on a common TCI state or spatial relation information. In some examples (e.g., in scenarios where base station 105-b employs multiple TRPs), a common default beam multiple default beams for simultaneous receive/transmit communications may be established (a default beam may be identified/established for each TRP). In some examples, the default beam may be identified based on a SDM pattern or configuration, a TDM pattern or configuration, a FDM pattern or configuration, or some combination thereof (e.g., a default beam 1 and a default beam 2 may be used on odd symbols in every slot and a default beam 3 and a default beam 4 may be used on even symbols in every slot, across all CCs in the same group).

In some examples, a default PDSCH beam may be used to receive PDSCH when scheduling offset between DCI and scheduled PDSCH is less than the beam switch latency (where the beam switch latency may, in some cases, be reported as a UE 115-b capability). When the CC has CORESET configured, default PDSCH beam may be determined by the Quasi Co-Location (QCL) assumption for receiving CORESET with lowest CORESET ID in latest monitored slot on the same CC. When the CC has no CORESET configured, default PDSCH beam may be determined by the QCL-TypeD reference signal (RS) in the activated PDSCH TCI state with lowest TCI state ID on the same CC.

At 415, the devices may communicate with each other (e.g., UE 115-b may communicate with base station 105-b, and vice versa) based on the identified default beam and at least one CC of the set of CCs. For example, UE 115-b and base station 105-b may communicate using any CC of the set of CCs, any combination of CCs within the set of CCs, or all of the CCs within the set of CCs (according to some carrier aggregation configuration, etc.) based on the identified default beam (as all CCs of the set of CCs may be associated with the same common default beam).

Figure 5:
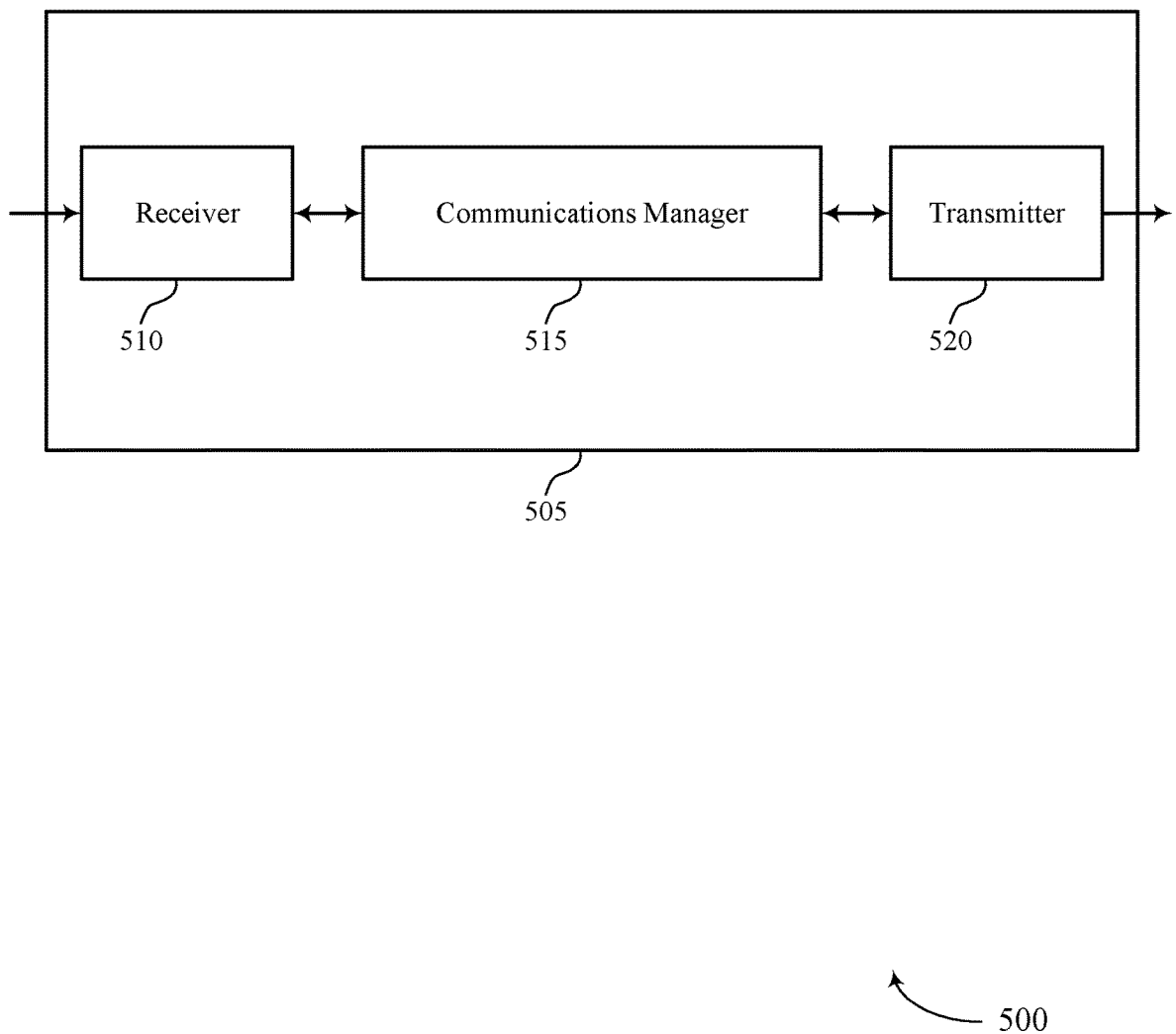
FIGS. 5 and 6 show diagrams of devices that support common default beam per CC group in accordance with aspects of the present disclosure.

FIG. 5 shows a diagram 500 of a device 505 that supports common default beam per CC group in accordance with aspects of the present disclosure. The device 505 may be an example of aspects of a device (e.g., a UE 115 and/or a base station 105) as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to common default beam per CC group, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a set of component carriers in a component carrier group, identify a default beam applicable for each component carrier of the set of component carriers in the component carrier group, and communicate with a second device based on the identified default beam and at least one component carrier of the set of component carriers. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
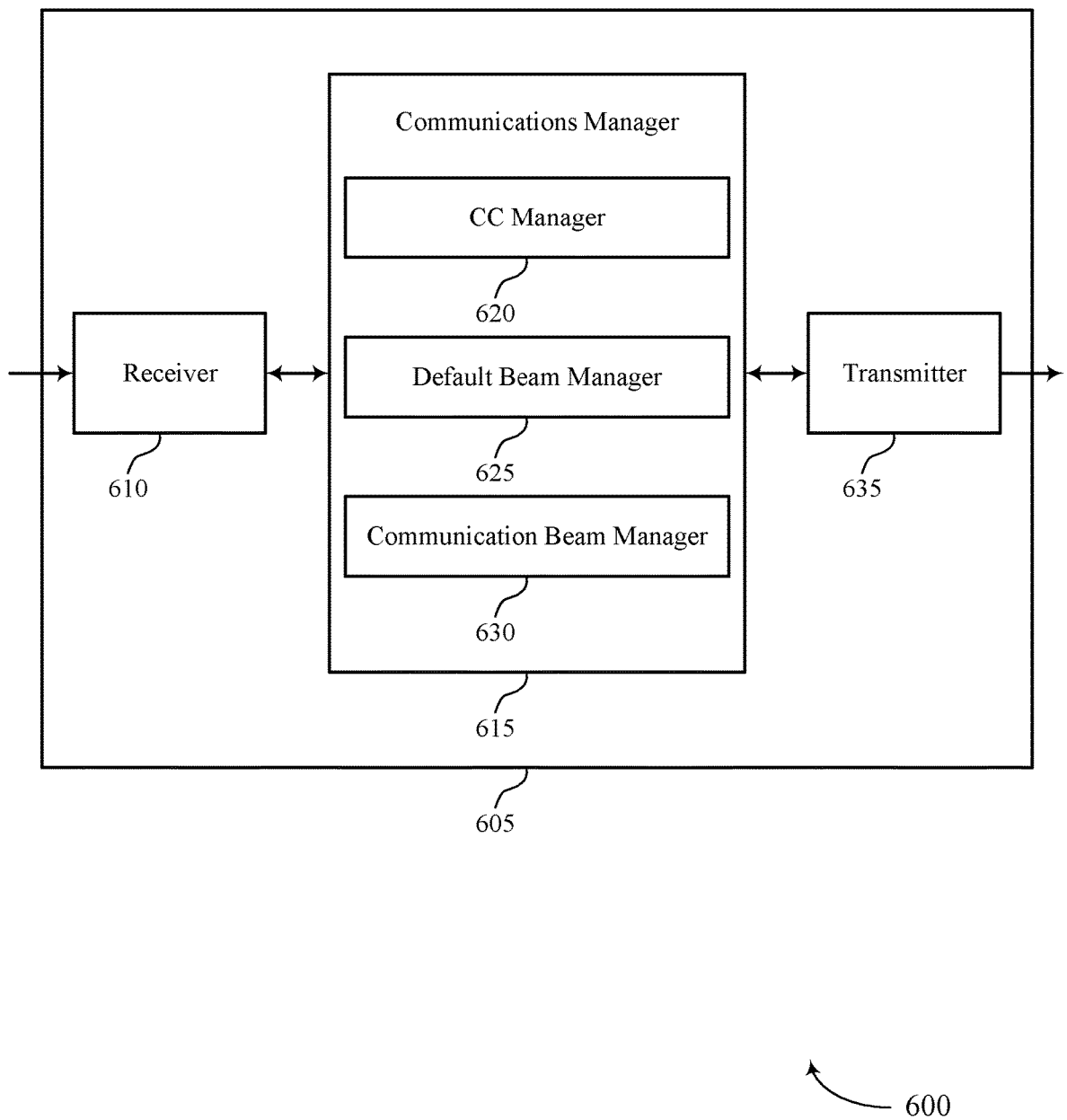

FIG. 6 shows a diagram 600 of a device 605 that supports common default beam per CC group in accordance with aspects of the present disclosure. The device 605 may be an example of aspects of a device 505, a UE 115, and/or a base station 105 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to common default beam per CC group, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a CC manager 620, a default beam manager 625, and a communication beam manager 630. The communications manager 615 may be an example of aspects of the communications manager 810 described herein.

The CC manager 620 may identify a set of component carriers in a component carrier group. The default beam manager 625 may identify a default beam applicable for each component carrier of the set of component carriers in the component carrier group. The communication beam manager 630 may communicate with a second device based on the identified default beam and at least one component carrier of the set of component carriers.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
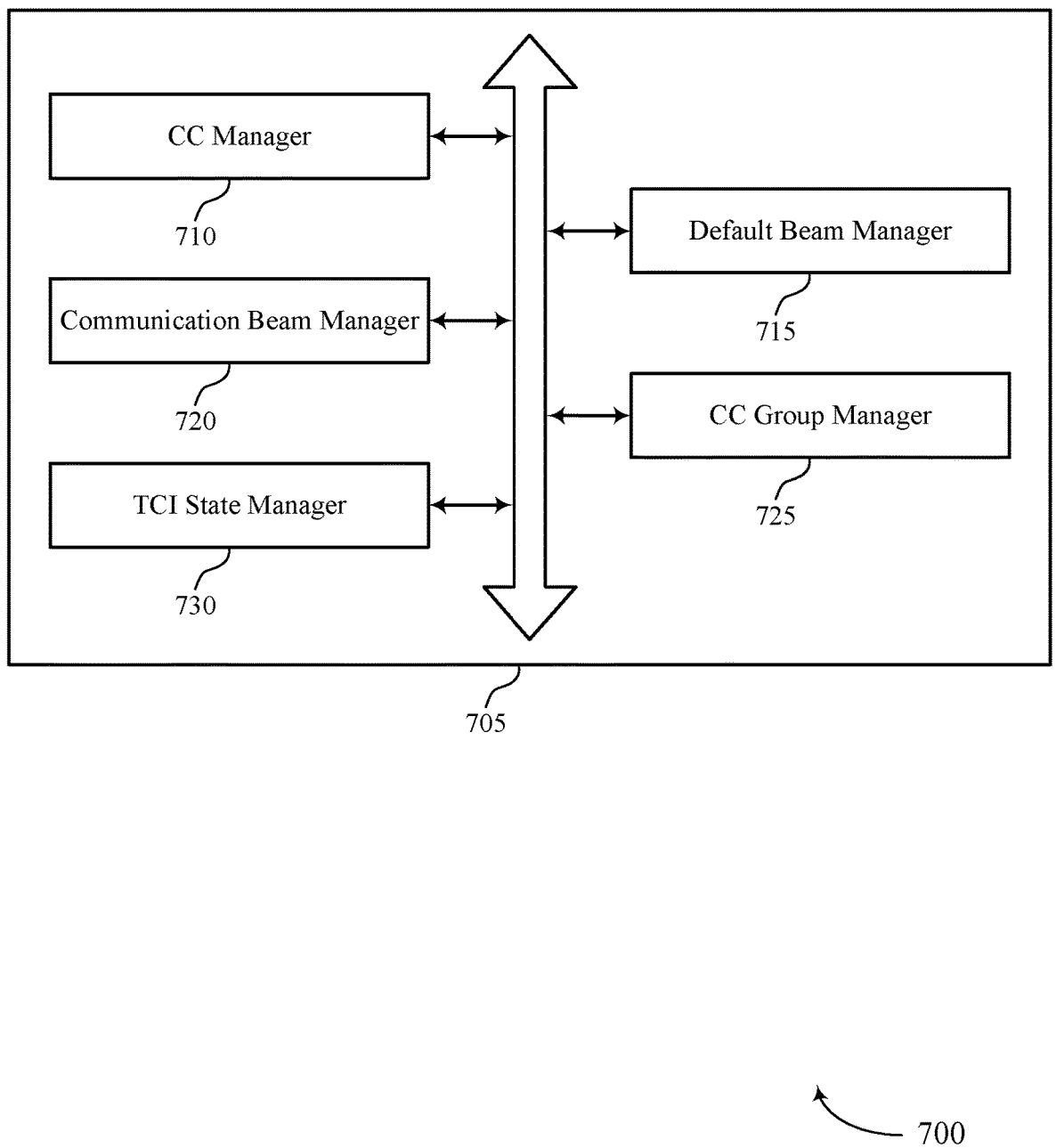
FIG. 7 shows a diagram of a communications manager that supports common default beam per CC group in accordance with aspects of the present disclosure.

FIG. 7 shows a diagram 700 of a communications manager 705 that supports common default beam per CC group in accordance with aspects of the present disclosure. The communications manager 705 may be an example of aspects of a communications manager 515, a communications manager 615, or a communications manager 810 described herein. The communications manager 705 may include a CC manager 710, a default beam manager 715, a communication beam manager 720, a CC group manager 725, and a TCI state manager 730. Each of these modules may communicate, directly or indirectly, with one another (e.g., via one or more buses).

The CC manager 710 may identify a set of component carriers in a component carrier group. In some cases, the set of component carriers share an analog beamformer at the first device. In some cases, the set of component carriers share an analog beamformer at the second device.

The default beam manager 715 may identify a default beam applicable for each component carrier of the set of component carriers in the component carrier group. In some examples, the default beam manager 715 may identify the default beam based on a lowest control resource set identifier. In some examples, the default beam manager 715 may identify the default beam based on a configured primary cell. In some examples, the default beam manager 715 may identify the default beam based on a configured secondary cell. In some examples, the default beam manager 715 may identify the default beam based on a lowest component carrier index associated with the set of component carriers. In some examples, the default beam manager 715 may identify the default beam based on a highest component carrier index associated with the set of component carriers. In some examples, the default beam manager 715 may transmit an indication of the identified default beam to the second device, where the communicating is based on the transmitted indication. In some examples, the default beam manager 715 may transmit a set of multiple default beams for simultaneous transmit/receive communications with the second device.

In some examples, the default beam manager 715 may identify the default beam based on spatial division multiplexing pattern, a time division multiplexing pattern, a frequency division multiplexing pattern, or some combination thereof. In some examples, the default beam manager 715 may receive an indication of the default beam from the second device, where the default beam is identified based on the received indication. In some cases, the indication of the identified default beam includes a common transmission configuration indication state. In some cases, the indication of the identified default beam includes spatial relationship information. In some cases, each default beam of the set of multiple default beams corresponds to a transmission/reception point of the first device. In some cases, the default beam includes a default uplink beam, a default downlink beam, or both. In some cases, the default beam manager 715 may determining a path loss for the default beam, and associate the determined path loss to one or more other component carriers of the set of component carriers. In some cases, the default beam manager 715 may associate the determined path loss across component carriers of a transmission/reception point affiliated with the default beam The communication beam manager 720 may communicate with a second device based on the identified default beam and at least one component carrier of the set of component carriers.

The CC group manager 725 may transmit an indication of the identified set of component carriers included in the component carrier group. In some examples, the CC group manager 725 may receive an indication of the set of component carriers included in the component carrier group, where the set of component carriers in the component carrier group are identified based on the received indication.

The TCI state manager 730 may identify one or more transmission configuration indication states active for a cell associated with the second device, where the default beam is identified based on a lowest transmission configuration indication state identifier of the identified one or more transmission configuration indication states active for the cell.

Figure 8:
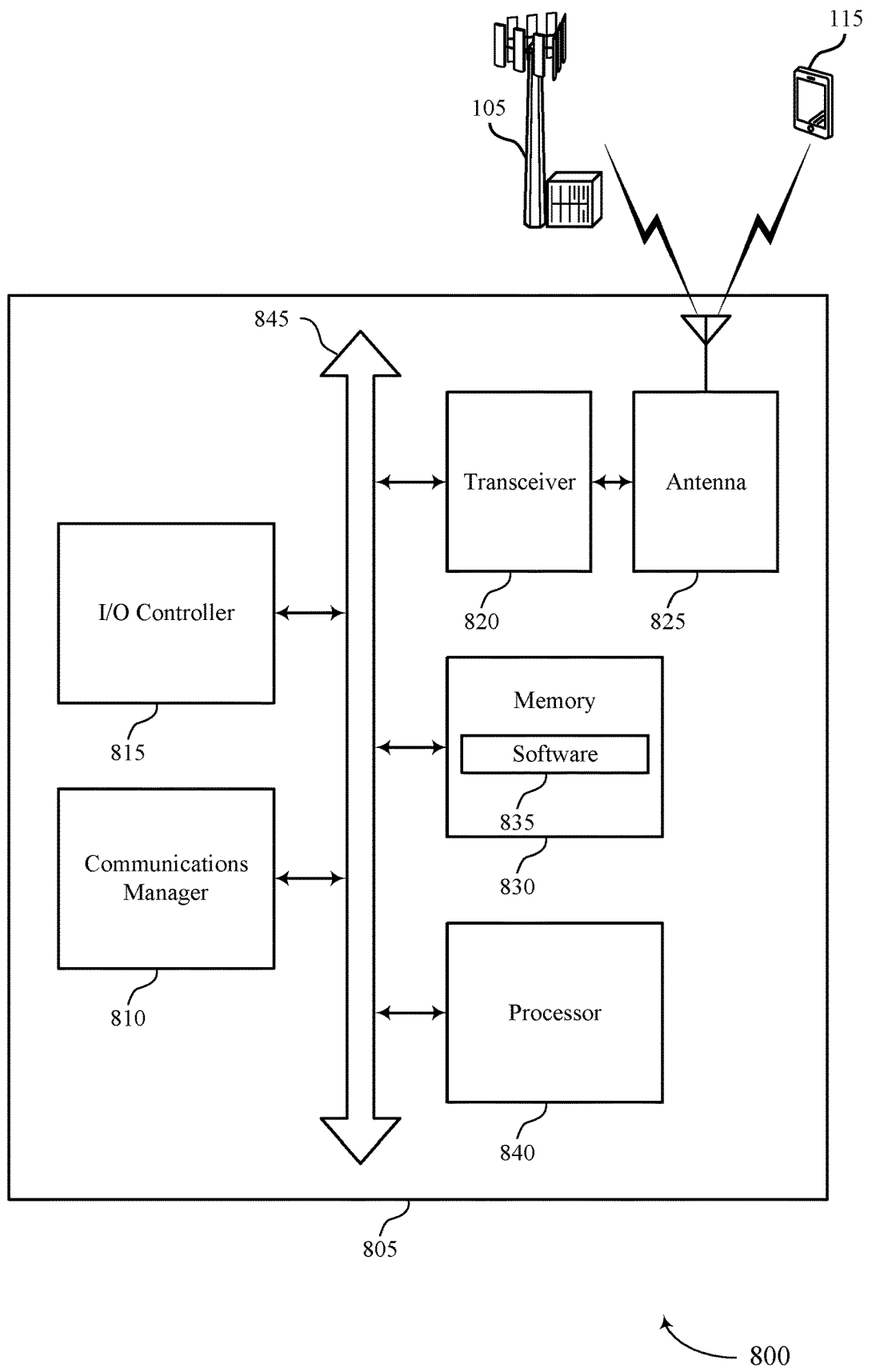
FIG. 8 shows a diagram of a system including a device that supports common default beam per CC group in accordance with aspects of the present disclosure.

FIG. 8 shows a diagram of a system 800 including a device 805 that supports common default beam per CC group in accordance with aspects of the present disclosure. The device 805 may be an example of or include the components of device 505, device 605, a UE 115, and/or a base station 105 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a set of component carriers in a component carrier group, identify a default beam applicable for each component carrier of the set of component carriers in the component carrier group, and communicate with a second device based on the identified default beam and at least one component carrier of the set of component carriers.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code or software 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting common default beam per CC group).

The software 835 may include instructions to implement aspects of the present disclosure, including instructions to support wireless communications. The software 835 may be stored in a non-transitory computer-readable medium such as system memory or other type of memory. In some cases, the software 835 may not be directly executable by the processor 840 but may cause a computer (e.g., when compiled and executed) to perform functions described herein.

As discussed herein, device 805 may illustrate aspects of a base station 105, a UE 115, or both. As such, additional components may be added to device 805, or in some cases some components may not be included in device 805. As an example, in cases where device 805 illustrates a base station 105, such a device may further include a network communications manager and an inter-station communications manager. The network communications manager may manage communications with the core network (e.g., a core network 130 via one or more wired backhaul links). For example, the network communications manager may manage the transfer of data communications for client devices, such as one or more UEs 115. The inter-station communications manager may manage communications with other base station 105, and may include a controller or scheduler for controlling communications with UEs 115 in cooperation with other base stations 105. For example, the inter-station communications manager may coordinate scheduling for transmissions to UEs 115 for various interference mitigation techniques such as beamforming or joint transmission. In some examples, the inter-station communications manager may provide an X2 interface within an LTE/LTE-A wireless communication network technology to provide communication between base stations 105.

Figure 9:
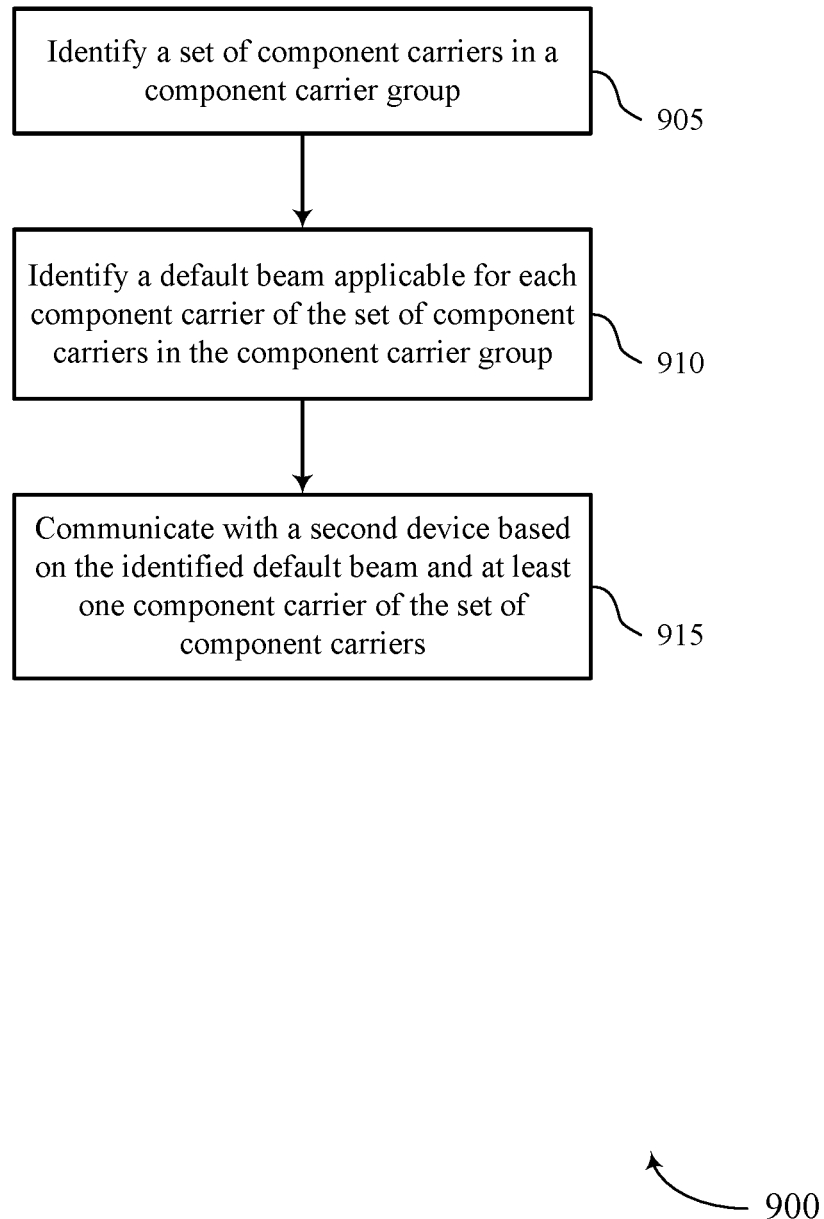
FIGS. 9 and 10 show flowcharts illustrating methods that support common default beam per CC group in accordance with aspects of the present disclosure.

FIG. 9 shows a flowchart illustrating a method 900 that supports common default beam per CC group in accordance with aspects of the present disclosure. The operations of method 900 may be implemented by a device or its components as described herein. For example, the operations of method 900 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may identify a set of component carriers in a component carrier group. The operations of 905 may be performed according to the methods described herein. In some examples, aspects of the operations of 905 may be performed by a CC manager as described with reference to FIGS. 5 through 8.

At 910, the device may identify a default beam applicable for each component carrier of the set of component carriers in the component carrier group. The operations of 910 may be performed according to the methods described herein. In some examples, aspects of the operations of 910 may be performed by a default beam manager as described with reference to FIGS. 5 through 8.

At 915, the device may communicate with a second device based on the identified default beam and at least one component carrier of the set of component carriers. The operations of 915 may be performed according to the methods described herein. In some examples, aspects of the operations of 915 may be performed by a communication beam manager as described with reference to FIGS. 5 through 8.

Figure 10:
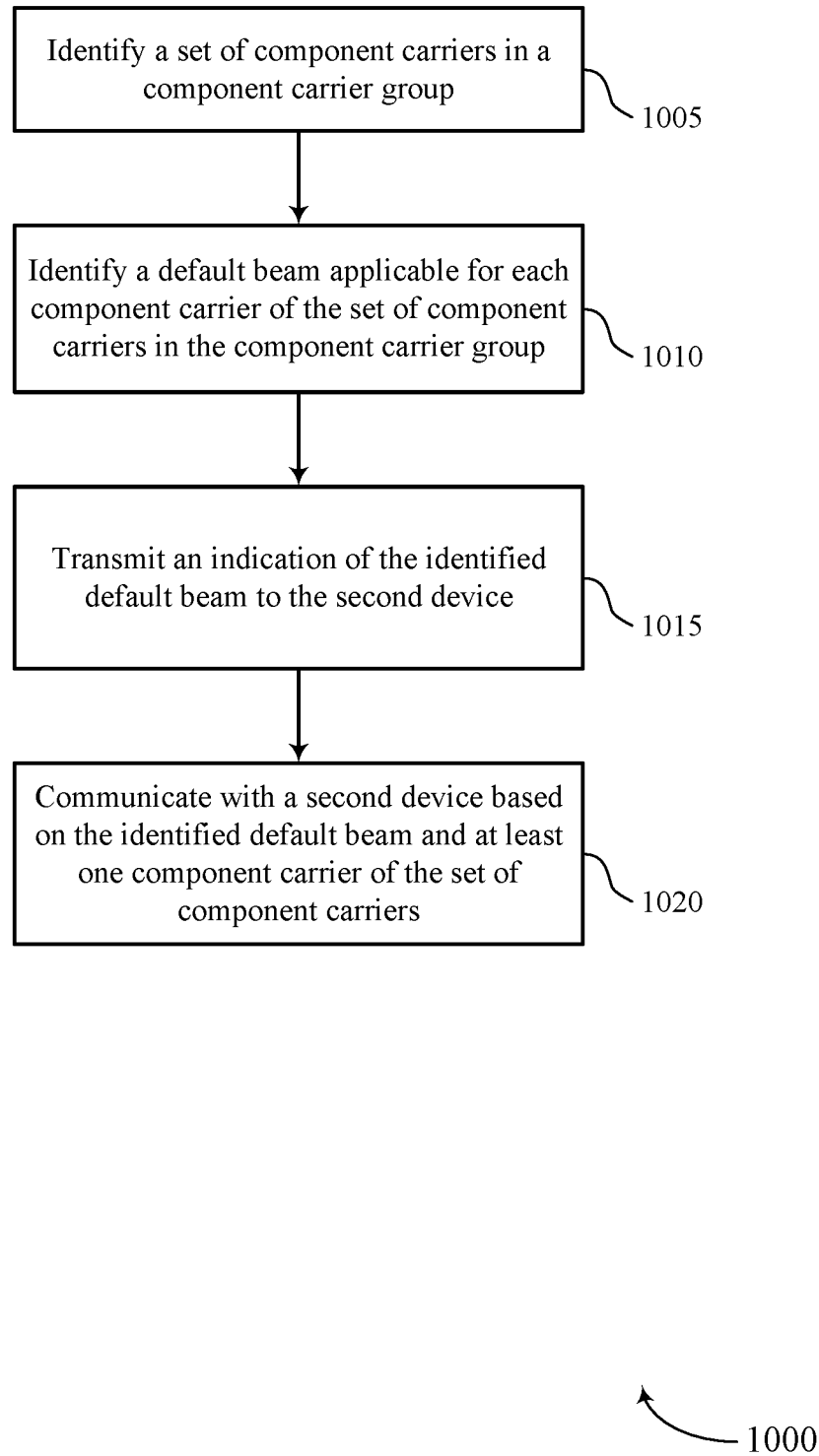

FIG. 10 shows a flowchart illustrating a method 1000 that supports common default beam per CC group in accordance with aspects of the present disclosure. The operations of method 1000 may be implemented by a device or its components as described herein. For example, the operations of method 1000 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may identify a set of component carriers in a component carrier group. The operations of 1005 may be performed according to the methods described herein. In some examples, aspects of the operations of 1005 may be performed by a CC manager as described with reference to FIGS. 5 through 8.

At 1010, the device may identify a default beam applicable for each component carrier of the set of component carriers in the component carrier group. The operations of 1010 may be performed according to the methods described herein. In some examples, aspects of the operations of 1010 may be performed by a default beam manager as described with reference to FIGS. 5 through 8.

At 1015, the device may transmit an indication of the identified default beam to a second device. The operations of 1015 may be performed according to the methods described herein. In some examples, aspects of the operations of 1015 may be performed by a default beam manager as described with reference to FIGS. 5 through 8.

For instance, in examples where the operations of method 1000 may be implemented by a base station 105 or its components as described herein, the indication may include information such as a set of multiple default beams for simultaneous transmit/receive communications with the second device (e.g., each default beam of the set of multiple default beams may correspond to a TRP of the device). In some cases, the indication may include information such as spatial relationship information, a common transmission configuration indication state, etc.

At 1020, the device may communicate with the second device based on the identified default beam and at least one component carrier of the set of component carriers. The operations of 1020 may be performed according to the methods described herein. In some examples, aspects of the operations of 1020 may be performed by a communication beam manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a first downlink control information (DCI) message indicating a common transmission configuration indication (TCI) state for the UE, the common TCI state corresponding to multiple component carriers for the UE;
   receiving, via a first beam, a second DCI message scheduling a downlink shared channel and indicating a second beam corresponding to the downlink shared channel; and
   receiving, via at least one component carrier of the multiple component carriers for the UE and in accordance with receiving the second DCI message, the downlink shared channel using a common beam corresponding to the common TCI state indicated by the first DCI message, wherein the common beam, corresponding to the common TCI state that corresponds to the multiple component carriers, is used to receive the downlink shared channel based at least in part on an offset between the second DCI message and the downlink shared channel being less than a beam switch latency that is associated with a capability of the UE.

2. The method of claim 1, further comprising:
   determining the common beam based at least in part on the common TCI state, wherein the common beam is used to receive the downlink shared channel via the at least one component carrier of the multiple component carriers for the UE.

3. The method of claim 1, wherein the common beam is used to receive the downlink shared channel based at least in part on the offset being below a threshold.

4. The method of claim 3, further comprising:
   transmitting a report indicating the capability of the UE, wherein the threshold is based at least in part on the capability.

5. The method of claim 1, further comprising:
   receiving an indication of the multiple component carriers for the UE.

6. The method of claim 1, further comprising:
   determining the common beam based at least in part on a lowest control resource set identifier.

7. A method for wireless communication at a network entity, comprising:
   transmitting a first downlink control information (DCI) message indicating a common transmission configuration indication (TCI) state for a user equipment (UE), the common TCI state corresponding to multiple component carriers (CCs) for the UE;
   transmitting, via a first beam, a second DCI message scheduling a downlink shared channel and indicating a second beam corresponding to the downlink shared channel; and
   transmitting, via at least one component carrier of the multiple component carriers for the UE and in accordance with transmitting the second DCI message, the downlink shared channel using a common beam corresponding to the common TCI state indicated by the first DCI message, wherein the common beam, corresponding to the common TCI state that corresponds to the multiple component carriers, is used to receive the downlink shared channel based at least in part on an offset between the second DCI message and the downlink shared channel being less than a beam switch latency that is associated with a capability of the UE.

8. The method of claim 7, wherein the common beam is based at least in part on the common TCI state and is used to receive the downlink shared channel via the at least one component carrier of the multiple component carriers for the UE.

9. The method of claim 7, wherein the common beam is used to transmit the downlink shared channel based at least in part on the offset being below a threshold.

10. The method of claim 9, further comprising:
    receiving a report indicating the capability of the UE, wherein the threshold is based at least in part on the capability.

11. The method of claim 7, further comprising:
    transmitting an indication of the multiple component carriers for the UE.

12. An apparatus for wireless communication at a user equipment (UE), comprising:
    one or more memories storing processor-executable code; and
    one or more processors coupled with the one or more memories and individually or collectively operable to execute the code to cause the UE to:
      receive a first downlink control information (DCI) message indicating a common transmission configuration indication (TCI) state for the UE, the common TCI state corresponding to multiple component carriers (CCs) for the UE;
      receive, via a first beam, a second DCI message scheduling a downlink shared channel and indicating a second beam corresponding to the downlink shared channel; and
      receive, via at least one component carrier of the multiple component carriers for the UE and in accordance with receiving the second DCI message, the downlink shared channel using a common beam corresponding to the common TCI state indicated by the first DCI message, wherein the common beam, corresponding to the common TCI state that corresponds to the multiple component carriers, is used to receive the downlink shared channel based at least in part on an offset between the second DCI message and the downlink shared channel being less than a beam switch latency that is associated with a capability of the UE.

13. The UE of claim 12, wherein the one or more processors are individually or collectively further operable to execute the code to cause the UE to:
    determining the common beam based at least in part on the common TCI state, wherein the common beam is used to receive the downlink shared channel via the at least one component carrier of the multiple component carriers for the UE.

14. The UE of claim 12, wherein the common beam is used to receive the downlink shared channel based at least in part on the offset being below a threshold.

15. The UE of claim 14, wherein the one or more processors are individually or collectively further operable to execute the code to cause the UE to:

transmit a report indicating the capability of the UE, wherein the threshold is based at least in part on the capability.

* * * * *